(12) United States Patent
Kelly

(10) Patent No.: US 11,696,136 B2
(45) Date of Patent: Jul. 4, 2023

(54) METHOD AND SYSTEM FOR RELAY ATTACK PREVENTION INCORPORATING MOTION

(71) Applicant: ROBERT BOSCH (AUSTRALIA) PTY LTD, Clayton (AU)

(72) Inventor: Matthew Kelly, Victoria (AU)

(73) Assignee: ROBERT BOSCH (AUSTRALIA) PTY LTD, Victoria (AU)

( * ) Notice: Subject to any disclaimer, the term of this patent is extended or adjusted under 35 U.S.C. 154(b) by 181 days.

(21) Appl. No.: 16/765,129

(22) PCT Filed: Nov. 20, 2018

(86) PCT No.: PCT/AU2018/051243
§ 371 (c)(1),
(2) Date: May 18, 2020

(87) PCT Pub. No.: WO2019/095023
PCT Pub. Date: May 23, 2019

(65) Prior Publication Data
US 2020/0351665 A1   Nov. 5, 2020

(30) Foreign Application Priority Data
Nov. 20, 2017 (AU) .................................. 2017904687

(51) Int. Cl.
*H04W 12/122* (2021.01)
*H04W 12/64* (2021.01)
(Continued)

(52) U.S. Cl.
CPC ......... *H04W 12/122* (2021.01); *B60R 25/245* (2013.01); *H04B 17/318* (2015.01);
(Continued)

(58) Field of Classification Search
CPC ........ H04W 4/30–48; H04W 84/18–22; B60R 25/245; H04B 17/318
See application file for complete search history.

(56) References Cited

U.S. PATENT DOCUMENTS 9,002,540 B2   4/2015   Ledendecker
9,008,917 B2 *  4/2015   Gautama ............ G07C 9/00309
                                                              455/41.2
(Continued)

FOREIGN PATENT DOCUMENTS

CN   204055716 U   12/2014
CN   105899413 A    8/2016
(Continued)

OTHER PUBLICATIONS

International Search Report for PCT/AU2018/051243, dated Feb. 4, 2019.
(Continued)

*Primary Examiner* — San Htun
(74) *Attorney, Agent, or Firm* — Norton Rose Fulbright US LLP

(57) ABSTRACT

A method and system for detecting if a relay is present in a PEPS system for a vehicle is provided by (a) determining whether movement of an authentication device was detected within a predefined time period after the authentication device enters a PEPS entry operational region; and (b) determining if the authentication device was stationary for a predetermined time period during a PEPS entry triggering event.

9 Claims, 4 Drawing Sheets

(51) Int. Cl.
  *H04W 12/12* (2021.01)
  *H04B 17/318* (2015.01)
  *B60R 25/24* (2013.01)
  *H04W 12/069* (2021.01)
  *H04W 12/104* (2021.01)

(52) U.S. Cl.
  CPC ....... *H04W 12/069* (2021.01); *H04W 12/104* (2021.01); *H04W 12/12* (2013.01); *H04W 12/64* (2021.01)

(56) References Cited

U.S. PATENT DOCUMENTS

| | | | |
|---|---|---|---|
| 2011/0148573 A1 | 6/2011 | Ghabra et al. | |
| 2013/0297194 A1* | 11/2013 | Wisnia | B60R 25/209 701/113 |
| 2014/0285319 A1* | 9/2014 | Khan | B60R 25/00 340/5.61 |
| 2014/0330449 A1* | 11/2014 | Oman | B60R 25/01 701/2 |
| 2014/0375420 A1* | 12/2014 | Seiberts | B60R 25/2072 340/5.31 |
| 2014/0375423 A1 | 12/2014 | Lagabe | |
| 2015/0074805 A1* | 3/2015 | Choi | G07C 9/20 726/22 |
| 2015/0302673 A1 | 10/2015 | Seiberts et al. | |
| 2015/0332530 A1* | 11/2015 | Kishita | E05B 49/00 70/256 |
| 2018/0099643 A1* | 4/2018 | Golsch | B60R 25/24 |

FOREIGN PATENT DOCUMENTS

| | | |
|---|---|---|
| CN | 106161421 A | 11/2016 |
| JP | 2011052505 A | 3/2011 |

OTHER PUBLICATIONS

International Preliminary Report on Patentability for PCT/AU2018/051243, dated Mar. 19, 2020.

Office Action issued in the corresponding CN appln. No. 201880085399.4, dated Mar. 23, 2022, 4 pages.

Office Action issued in the corresponding CN appln. No. 201880085399.4, dated Aug. 11, 2022, 14 pages.

\* cited by examiner

METHOD AND SYSTEM FOR RELAY ATTACK PREVENTION INCORPORATING MOTION

FIELD OF THE INVENTION

The present invention relates to passive entry passive start (PEPS) systems and in particular, detection and/or prevention of relay attacks on PEPS systems in vehicles used to enter and/or start to the vehicle.

BACKGROUND INFORMATION

PEPS systems allow authorized users (with a valid key fob) to lock/unlock and start their vehicle without having to interact with the remote control (i.e. authorized key fob). The PEPS system may unlock or start the vehicle via a manually triggered input request (capacitive sensor, push button, etc.) if the key fob is determined to be in a valid PEPS region.

A PEPS system may define operating regions such that if an authorized key fob is located within the correct operating region then the vehicle will respond to lock/unlock and start requests. PEPS regions can be defined by low frequency (LF) signal fields emitted from antennas on the vehicle. A received signal strength indicator (RSSI) is typically implemented in the authorized key fob as an abstraction of the magnetic field strength. The PEPS system may define the external operating regions and internal operating regions using the RSSI signal levels from the various antennas on the vehicle. If an authorized key fob is located within the correct regions, i.e., the RSSI levels correspond to a defined region then the vehicle will respond to lock/unlock and start requests.

A problem associated with PEPS systems is that vehicle thieves may utilize what is known as a "relay attack" to steal the vehicle. The relay attack tricks the PEPS system into believing that the thief is an authorized user (in a defined operating region).

A relay attack generally requires two thieves ("Thief A" and "Thief B") together with the authorized user (i.e. vehicle owner or other possessor of the key fob) being the same vicinity. A relay attack involves extending the range of the LF field so that an authorized key fob which is not in proximity of the vehicle will receive the LF challenge signal. "Thief A" carries a relay receiver (to receive the LF signal) and is located close to the vehicle while "Thief B" carries relay transmitter (to retransmit the LF signal) and is located in close proximity to the authorized key fob. In an "analog relay", the relay receiver receives the LF signal then up-converts the frequency to a radio frequency (RF) and transmits it over an RF link to the relay transmitter. The relay transmitter receives the RF signal and the down-converts the RF signal to LF and re-transmits the LF signal to an authorized key fob. Analog relays are independent of the modulation and encoding of the LF signal. Other relay configurations are possible, for example, a "digital relay" where the relay receiver demodulates the LF signal and then the data stream is modulated over RF and transmitted. The relay transmitter demodulates the RF signal and then the data stream is modulated over LF and re-transmitted.

A key fob automatically transmits an RF response upon receiving the LF challenge. The RF response signal will typically transmit between approximately 20-200 m back to the vehicle. If the vehicle receives this response then it will assume that the key fob is in the vicinity of the vehicle and so the request will be authenticated. In addition, the relay attack method may also be applied to extend the range of the RF response range beyond the transmit range of the key fob.

In summary, in a relay attack, thieves are able to enter and start a vehicle when the key fob is outside its normal operating regions by relaying messages from one location to another to make the vehicle appear closer to the key fob.

Techniques exist which aim to prevent relay attack by analysis of the PEPS LF and UHF signals, for example measuring the time of flight, signal vector checks and/or signal superposition, etc. These techniques are generally complicated, ineffective or expensive.

A further problem is that, the PEPS system is vulnerable to a "driveway attack". The scenario whereby a person parks their vehicle in their driveway and then leaves the vehicle key fob in the house in close proximity to the exterior walls is not difficult to imagine. The "driveway attack" simply requires the thief (Thief A) to trigger the manual input unlock request (capacitive sensor, push button, etc. on a door handle) and relay the LF signals to another thief (Thief B) standing outside the walls of the house. Thief B can then relay the signals into the house. If the key fob is situated close enough to the exterior walls, for example, behind the front door of the vehicle owner's house, then the key fob may receive the signal and send an RF response to unlock or start the vehicle upon request.

In order to prevent a "driveway attack", techniques have been developed which focus on the movement of the key fob relative to the vehicle to determine if there is an attack, for example, the key fob LF receiver is disabled when the key fob is not moving for a predetermined time thereby not permitting a thief access to the vehicle.

A problem with the prior art approaches is that they are limited in the complexity of movements. For example, JP 2011052505A discusses a relay attack countermeasure for a PEPS system utilizing a motion sensor in a key fob to track the key fob movement from outside to inside the vehicle. A limitation with this arrangement is that it does not detect any change in key fob motion, e.g., from movement to stationary, it only detects that the key fob is moving.

Patent document US 2015/0302673 A1 discusses a relay attack countermeasure for a PEPS system utilizing a key fob with a motion sensor to track the key fob movement to determine the distance travelled based on the key fob speeds and the RSSI data.

Patent document U.S. Pat. No. 9,002,540 B2 discusses a relay attack countermeasure for PEPS system utilizing a motion sensor to detect and store the last key fob movement (within a predetermined time window) before an entry request. Vehicle entry is only permitted if the last recorded key fob movement occurs within the predetermined time window.

Patent document US 2014/0375423 A1 discusses a relay attack countermeasure for a PEPS system utilizing a motion sensor to detect that the key fob is moving before an entry request. Vehicle entry is only permitted if the key fob has stopped moving when an entry request is made. In addition, Vehicle start is only permitted if the key fob is stationary when a start request is made.

A problem with all of these prior art arrangements is that they cannot determine whether the key fob was in motion when entering the LF field in the vicinity of the vehicle or detect any complex movements of the key fob.

Before turning to a summary of the present invention, it will be appreciated that the discussion of the background to the invention is included to explain the context of the invention. This is not to be taken as an admission that any of the material referred to is published, known or part of the common general knowledge.

SUMMARY OF THE INVENTION

According to a first aspect, the present invention provides, a method of detecting if a relay is present in a PEPS system for a vehicle including the steps of: (a) determining whether movement of an authentication device was detected within a predefined time period after the authentication device enters a PEPS entry operational region; and (b) determining if the authentication device was stationary for a predetermined time period during a PEPS entry triggering event.

According to a second aspect, the present invention provides, a method of detecting if a relay is present in a PEPS system for a vehicle including the steps of: (a) determining if an authentication device was stationary for a predetermined time period during a PEPS entry triggering event; and (b) upon a PEPS start sensor on the vehicle being triggered: (i) determining whether movement of the authentication device was detected before the PEPS start sensor on the vehicle was triggered; and (ii) determining whether the authentication device was detected as stationary for a predefined time period during the PEPS start triggering event.

According to a third aspect, the present invention provides, a method of detecting if a relay is present in a PEPS system for a vehicle including the steps of: (a) determining whether movement of an authentication device was detected within a predefined time period after the authentication device entered a PEPS entry operational region; and (b) determining if the authentication device was stationary for a predetermined time period during a PEPS entry triggering event; and (c) upon a PEPS start sensor on the vehicle being triggered: (i) determining whether movement of an authentication device was detected before the PEPS start sensor on the vehicle was triggered; and (ii) determining whether the authentication device was detected as stationary for a predefined time period during the PEPS start triggering event.

The authentication device may be a key fob, mobile communication device or RF device. The PEPS operating regions may be defined by LF magnetic fields emitted from antennas on the vehicle. RSSI may be utilized in the key fob and the PEPS system may define the external operating regions and internal operating regions using the RSSI signal levels measured from the various antennas on the vehicle. Then, if a key fob is located within the correct regions, i.e., entry or start regions (i.e. the RSSI levels correspond to a defined operating region) then the vehicle 105 will respond to the lock/unlock and start request.

The PEPS operation of a vehicle may be triggered by way of a sensor associated with the vehicle and may include one or more of a capacitive sensor or push button, etc.

The predetermined time period may be defined based on system requirements but may be for example, in the order of milliseconds.

According to a fourth aspect, the present invention provides, a system for detecting if a relay is present in a PEPS system for a vehicle including: one or more antennas associated with the vehicle for transmitting signals from the one or more antennas to an authentication device, the authentication device including a motion sensor, and one or more controllers configured to: (a) determine whether movement of an authentication device was detected within a predefined time period after the authentication device enters a PEPS entry operational region; and (b) determine if the authentication device was stationary for a predetermined time period during a PEPS entry triggering event.

According to a fifth aspect, the present invention provides, a system for detecting if a relay is present in a PEPS system for a vehicle including: one or more antennas associated with the vehicle for transmitting signals from the one or more antennas to an authentication device, the authentication device including a motion sensor, and one or more controllers configured to: (a) determine if the authentication device was stationary for a predetermined time period during a PEPS entry triggering event; and (b) upon a PEPS start sensor on the vehicle being triggered: (i) determine whether movement of the authentication device was detected before the PEPS start sensor on the vehicle was triggered; and (ii) determine whether the authentication device was detected as stationary for a predefined time period during the PEPS start triggering event.

According to a sixth aspect, the present invention provides, a system for detecting if a relay is present in a PEPS system for a vehicle including: one or more antennas associated with the vehicle for transmitting signals from the one or more antennas to an authentication device, the authentication device including a motion sensor, and one or more controllers configured to: (a) determine whether movement of an authentication device was detected within a predefined time period after the authentication device enters a PEPS entry operational region; (b) determine if the authentication device was stationary for a predetermined time period during a PEPS entry triggering event; and (c) upon a PEPS start sensor on the vehicle being triggered: (i) determine whether movement of the authentication device was detected before the PEPS start sensor on the vehicle was triggered; and (ii) determine whether the authentication device was detected as stationary for a predefined time period during a PEPS start triggering event.

It will be appreciated that a controller can be located in the vehicle or the authentication device only or in both the vehicle and authentication device.

DETAILED DESCRIPTION

Figure 1:
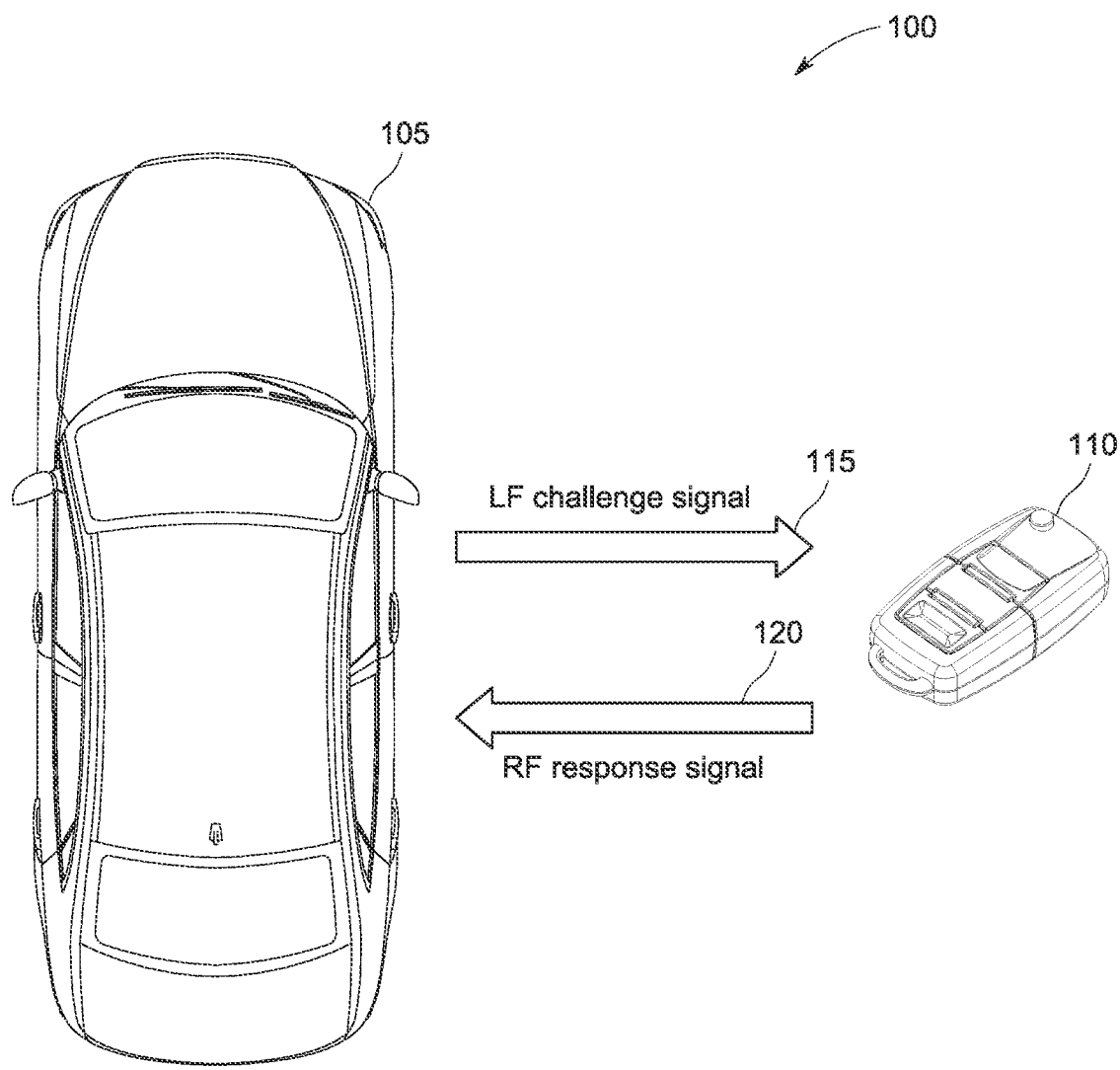
FIG. 1 is a schematic diagram illustrating a PEPS system.

A schematic diagram illustrating a vehicle PEPS system 100 is shown in FIG. 1. The PEPS system 100 allows a vehicle owner (or possessor of the key fob) to lock/unlock and start a vehicle 105 without having to interact with the key fob 110. Typical PEPS systems define external entry operating regions and internal start operating regions. If a key fob 110 is located within an operating region then the vehicle 105 will respond to lock/unlock and start requests.

The PEPS operating regions may be defined by low frequency (LF) signal magnetic fields emitted from antennas on the vehicle. Received signal strength indicator (RSSI) can be utilized in the key fob and the PEPS system may define the external operating regions and internal operating regions using the RSSI signal levels measured from the various antennas on the vehicle 105. Then, if a key fob 110 is located within the correct regions (i.e. the RSSI levels correspond to a defined operating region) then the vehicle 105 will respond to the lock/unlock and start request.

PEPS systems may be configured to have a manually triggered unlock and start request (such as a capacitive sensor, push button and the like provided for example on the handle of the vehicle, or in the vehicle Start/Stop 105) to transmit the LF challenge signal 115 to the key fob 110. As part of the LF challenge signal 115, signals are transmitted from several (or all) of the vehicles antennas. If a key fob 110 is located within the expected operating regions (based on the RSSI values measured from the vehicle antennas), after receiving the LF challenge signal 115 it will transmit an authentication response signal on a radio frequency (RF) 120 for the request to be processed in the vehicle. It will be appreciated that bi-directional RF communication may also be used.

Some PEPS systems also provide permanent periodically transmitted LF challenge signals 115 prior to the manually triggered unlock request. For these systems, the vehicle knows when the key fob 110 is in the vicinity of the vehicle before an unlock request is made. The advantage of this is that it can improve system response times and provide additional features such as comfort lighting as the owner approaches the vehicle 105.

Figure 2:
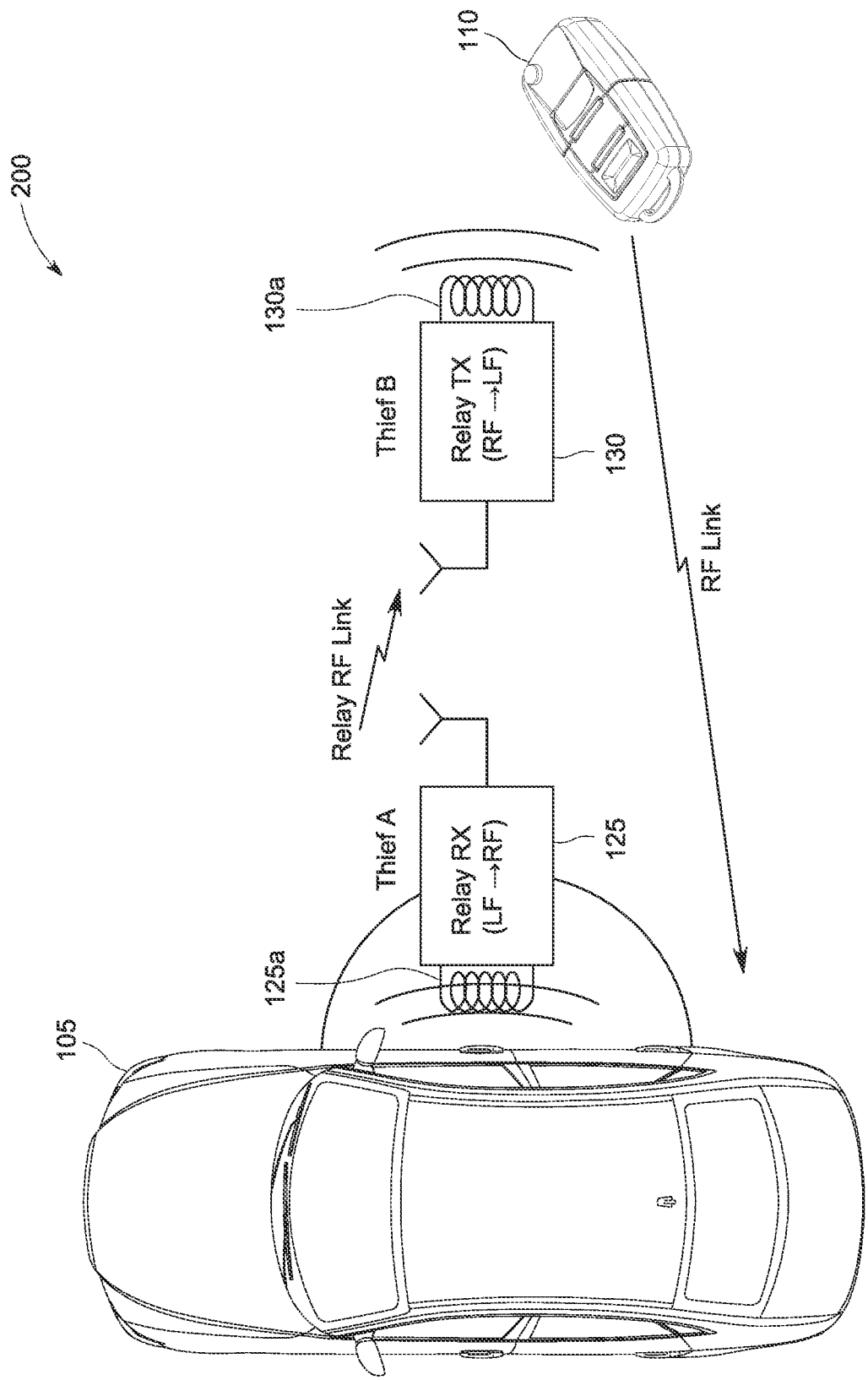
FIG. 2 is a schematic diagram illustrating a relay attack on a vehicle having a PEPS system.

As shown in the FIG. 2, the PEPS system 200 is vulnerable to theft due to what is known as "relay attack". The present invention attempts to prevent a relay attack from being successful. In FIG. 2, the relay attack involves extending the range of the LF field (shown in FIG. 1) so that a key fob 110 which is not in proximity of the vehicle 105 will receive the LF challenge signal. The relay attack requires two thieves, Thief A and Thief B where Thief A carries a relay receiver (Relay RX) 125 and is located close to the vehicle 105 while Thief B carries a relay transmitter (Relay TX) 130 and is located close to the key fob 110.

Relay RX 125 receives an LF signal from vehicle 105 and then up-converts the frequency to an RF frequency and transmits it via RF link to Relay TX 130. Relay TX 130 receives the RF signal and then down-converts the frequency to LF and re-transmits the LF signal to the key fob 110. This scenario highlights the previously defined "analog relay", however, other types of relays could be used. The key fob 110 automatically transmits an RF response upon receiving the LF challenge. The RF response signal will typically transmit between approximately 20-200 m back to the vehicle 105. If the vehicle 105 receives this response it will assume that the key fob 110 is in the vicinity of the vehicle 105 and so the request will be authenticated. In addition, the relay attack method may also be applied to extend the range of the RF response range beyond the transmit range of the key fob 110.

The PEPS system is also vulnerable to a "driveway attack" where it is possible to unlock or start the vehicle 105. The "driveway attack" simply requires the thief (Thief A) to trigger the manual input unlock request (capacitive sensor, push button, etc. on a door handle) on the vehicle 105 and relay the LF signals using the relay receiver 125 to another thief (Thief B) standing outside the exterior walls of the house. Thief B can then relay the signals into the house using the relay transmitter 130. If the key fob 110 is situated in close proximity to the exterior walls, for example, behind the front door of the vehicle owner's house, then the key fob 110 may receive the LF signal and send an RF response to unlock or start the vehicle 105 upon request. The present invention utilizes LF signals sent from antennas associated with vehicle 105. The first signal is a periodically transmitted signal to determine whether the key fob 110 is moving when entering into a PEPS entry operational region and the second and third signals determines whether the key fob 110 movement is as expected during and preceding entry and start triggering events. The present invention requires a complicated series of movements to be satisfied in order to enter and start the vehicle 105. For example:

1. The PEPS system uses a periodically transmitted LF challenge signal. Movement of key fob 110 must be detected when entering the LF field in the vicinity of a vehicle 105.
2. Movement of key fob 110 must be detected as "stationary" when the entry button (or sensor) is triggered. The entry button must be pressed before a predetermined time window has expired in order to avoid the likelihood of a "driveway" attack.

In addition, further movements may be utilized:

3. Movement of the key fob 110 must be detected after the second criteria above and before the start button (or sensor) is triggered.
4. Movement of the key fob 110 must be detected "stationary" when the start button (or sensor) is triggered.

Advantageously, the present invention allows for a vehicle 105 using a PEPS system which requires a complicated movement pattern to be detected in order to enter and start the vehicle 105. In the present invention:

1. The key fob 110 must be moving when Thief A via relay 125, relays the first LF signal, in order for the first stage of the relay attack to be successful.
2. During the triggering of the PEPS entry sensor on the vehicle 105 the key fob 110 must be stationary, therefore the thieves must ensure the key fob is not moving when Thief A triggers the sensor and relays the second signal.
3. After the second criteria (above) has been completed the key fob must detect movement before a start sensor on the vehicle 105 has been triggered. This represents the situation where the owner has opened the vehicle door then moved to enter the vehicle before triggering the vehicle start button or sensor. In order for this stage of the relay attack to be successful the thieves must ensure the key fob moves again after the second criteria is completed and before Thief A triggers the start sensor.
4. The key fob 110 must be detecting as stationary when the start sensor on the vehicle 105 is triggered. This would be a situation where the owner has sat in the driver's seat and the key fob is "stationary" when the vehicle 105 start button or sensor is triggered. Therefore the thieves must ensure the key fob is not moving when Thief A triggers the start sensor and relays the third signal.

Prior art approaches can only determine that the key fob 110 was moving at some point before the entry request, but cannot determine where this occurred (i.e. whether it occurred in the vicinity of the vehicle 105, or not). In addition the present invention can be implemented for motion to be detected before a start request (after detecting that the key fob 110 was stationary during the entry request). This means a relay attack becomes inherently more difficult for the thief since movement of the key fob 110 must be in a sequence and must be initiated by two parties (Thief A, associated with relay 125, and Thief B, associated with relay 130 to successfully perform a relay attack).

Figure 3:
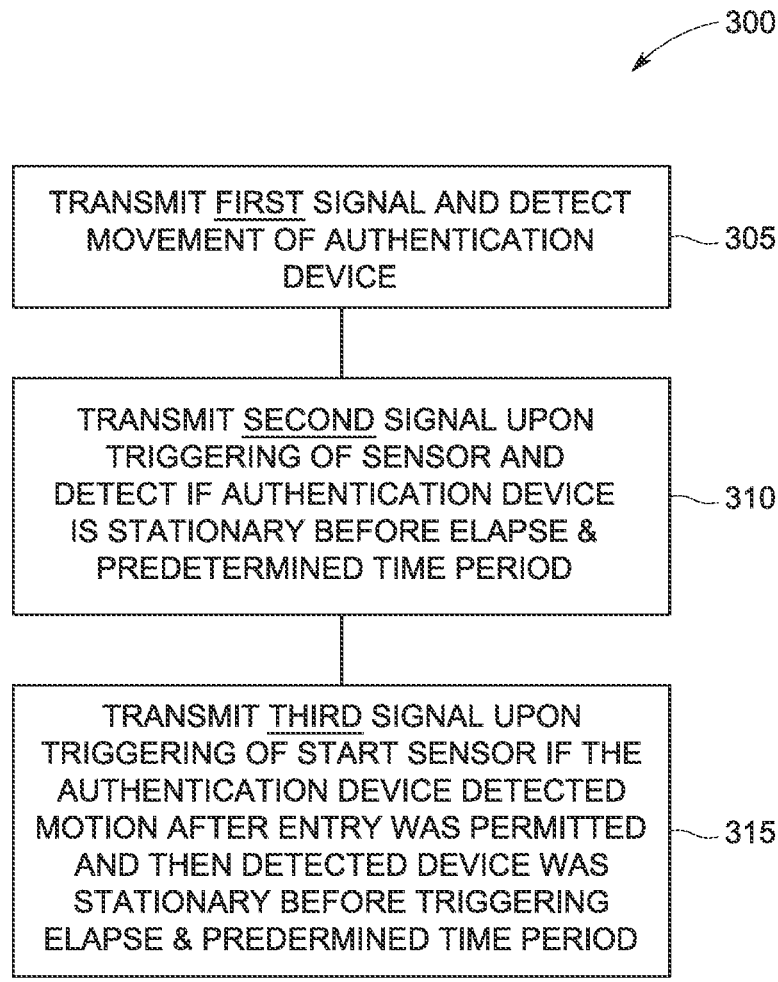
FIG. 3 is a flow diagram illustrating the method of the present invention to prevent a relay attack on a vehicle having a PEPS system.

A flow diagram illustrating the method of the present invention is shown in FIG. 3. In general terms the method of detecting if a relay is present in a PEPS system for a vehicle includes first determining whether any movement of an authentication device was detected within a predefined time period after the authentication device enters a PEPS entry operational region; then determining if the authentication device was stationary for a predetermined time period during a PEPS entry triggering event; then upon a PEPS start sensor on the vehicle being triggered determining whether movement of the authentication device was detected before the PEPS start sensor on the vehicle was triggered and whether the authentication device was detected as stationary for a predefined time period during the PEPS start triggering event. This may be carried out in a number of ways including sending one or more signals between the antennas associated with the vehicle and the authentication device, which may take the form of a key fob or mobile communication device or the like.

In the embodiment shown in FIG. 3, the method 300 may be carried out in combination with the PEPS system associated with the vehicle 105 and an authentication device which takes the form of a key fob 110 and a controller (or multiple controllers). It will be appreciated that the key fob may be an authentication device that takes the form of a mobile communication device or RF device or the like.

At step 305, a first signal is transmitted from one or more antennas associated with the vehicle 305 and movement of the key fob 110 is detected within range of the vehicle.

If the key fob 110 is moving, that indicates the owner associated with the key fob is approaching the vehicle 105. It will be appreciated that the first signal may be repeatedly sent, i.e. in a polling arrangement to detect movement of the key fob 110.

Control then moves to step 310 where a second signal is transmitted from the one or more antennas associated with the vehicle 105 and, at the time an entry sensor on the vehicle 105 being triggered, determines whether or not the key fob 110 is stationary before a predetermined time period has elapsed.

Control then moves to step 315 where a third signal is transmitted from the one or more antennas associated with the vehicle 105 and, at the time of a start sensor on the vehicle 105 being triggered, determines whether or not the key fob 110 was in motion (after the preceding stationary period during entry) and is stationary during the start triggering event before a predetermined time period has elapsed. The first signal, second signal and third signal may be an LF signal or RF signal depending on the authentication device (i.e. key fob or mobile communication device).

While the present invention may simply provide steps 305, 310 and 315 to control access and avoid a relay attack, however, it is possible for systems to use only steps 305 and 310 or only steps 310 and 315 with reduced effectiveness of the relay attack countermeasure.

Figure 4:
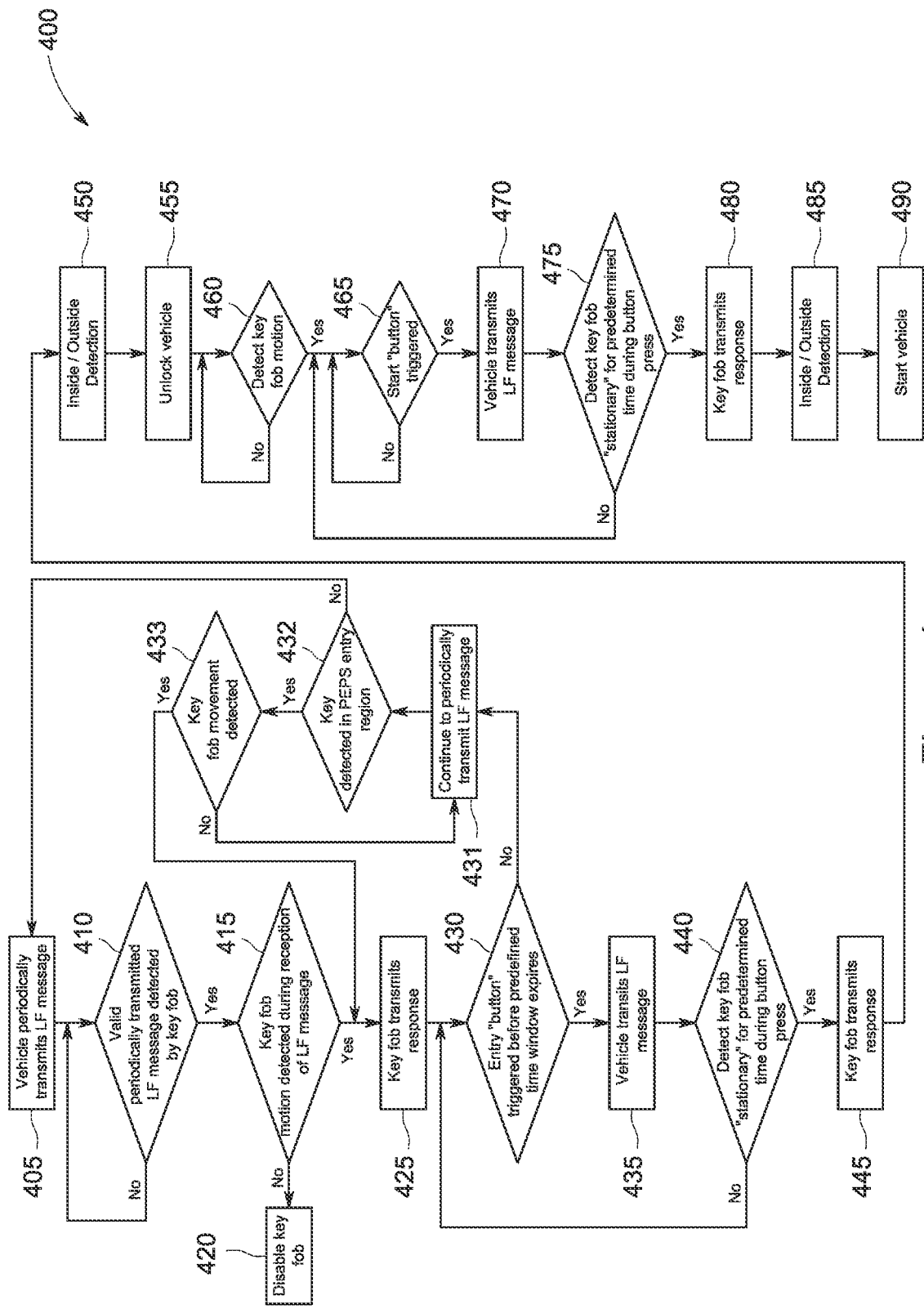
FIG. 4 is a flow diagram illustrating an embodiment of the method of the present invention to prevent a relay attack on the vehicle having a PEPS system.

FIG. 4 is a flow diagram illustrating an exemplary embodiment of the invention in operation. The method 400 may be carried out on the vehicle 105 having a PEPS system together with the key fob 110 and a controller (or multiple controllers) associated with the PEPS system 100.

At step 405, the vehicle 105 periodically transmits an LF challenge signal (i.e., a polled signal). Control then moves to step 410 where it is determined whether or not the periodically transmitted LF message has been detected by the key fob 110. If it has not been detected control returns to step 405 where the LF message is sent again until such time as the LF message is detected by the key fob 110 at which time control moves to step 415. At step 415 it is determined whether or not motion is detected in the key fob 110 during receipt of the LF message. It will be appreciated that the key fob 110 includes a motion sensor or the like, such as an accelerometer. Movement of the key fob 110 must be detected when entering the LF field within a particular time period in the vicinity of the vehicle.

It will be appreciated that the time gap between the periodically transmitted LF messages must be considered as a system error and if the key fob 110 is stationary when receiving the first LF message the motion during the gap time period must also be considered. For example, if the time between the periodically transmitted LF signal is 300 ms, it is possible that the key fob 110 enters the LF field region during this 300 ms. It is also possible for example that the key fob 110 is in a bag associated with the owner and might be placed stationary on the ground within this 300 ms timeframe and as will be appreciated, the key fob 110 will then be stationary when it receives the first LF message. Therefore, the key fob 110 must determine whether it was in motion within a predetermined time period (i.e. 300 ms) before receiving the LF message.

As noted above, at step 415 it is determined whether or not there is motion of the key fob 110 during reception of the LF message, if there is not, then control moves to step 420 where the key fob 110 may be disabled since it is possible that there is a relay attack occurring. Otherwise, control moves to step 425 where the key fob 110 transmits a response to the vehicle 105. The response may be a UHF response and it may occur within a predetermined time period.

After entering the LF field, the vehicle 105 continues to send periodic LF messages. If the key fob 110 was detected to be stationary after a predetermined time, the key fob will not send a response at step 430 (this feature is used to prevent a possible "driveway" attack). The vehicle 105 may provide an indication to the vehicle owner that the time window has expired by, for example, flashing the lights, sounding the horn or some other method in order to tell the vehicle owner to reactivate the key fob 110 by moving it. If at step 430, the PEPS entry button is not triggered before the predetermined time window has expired, control moves to step 431 where the vehicle continues to poll periodically and determine whether the key fob is still within the PEPS entry region. If at step 432, it is no longer detected in the region control returns to step 405. However, if the key fob is detected within the PEPS entry region at step 432, then control moves to step 433 where if the key fob 110 detects motion again, control returns to step 430.

When the PEPS entry button is triggered before the predetermined time window has expired, control moves to step 435 where the vehicle transmits another LF challenge signal. Control then moves to step 440 where it is determined whether or not the key fob 110 has been stationary during the triggering event for a predetermined time period before the key fob 110 transmits a UHF response at step 445. If the key fob 110 was not stationary for a predetermined time period at step 440 control returns to step 430. Otherwise, control moves to step 445 when the key fob 110 transmits the UHF response.

Control then moves to step 450 where it is detected that entry and (unlocking step 455) has been permitted. At step 460 it is determined whether or not there is a movement in the key fob 110 at this point. Movement of the key fob 110 must be detected after entry has been permitted at step 450 and 455 and before the start button is triggered at step 465. At step 465, when the start button is triggered, another LF challenge signal is transmitted by the vehicle at step 470.

Control then moves to step 475 where the key fob 110 must be determined as being stationary for a predetermined time period before control moves to step 480, otherwise control returns to step 465.

At step 480 the key fob 110 transmits a UHF response and the vehicle start process may be performed at step 485 and 490.

It will be appreciated that the key fob 110 does not necessarily need to send a response to the vehicle after receiving the LF challenge signal, that is, the key fob 110 may simply record that it was in motion when entering the LF field. When the entry LF challenge is received by the key fob 110 it will only respond (with a positive response) if at the initial periodically transmitted LF message motion was recorded.

It will also be appreciated that other polling regions may be added. For example, when the key fob 110 is detected moving in, for example an outer LF field region, the LF transmit power of the vehicle antennas can be reduced (or the accepted RSSI's for the region can be increased) to make a smaller LF operating region within the outer region. The key fob 110 must be found to be moving when entering into this smaller region for example. If additional polling regions are used, the decision on whether the key fob 110 is 'stationary' or 'moving' upon entering the multiple polling regions must be performed multiple times thereby further complicating the movement pattern thieves must replicate to perform a successful relay attack.

It will also be appreciated that a restriction on the number of times a key fob 110 may enter or exit the LF field region may be implemented in order to restrict the number of times a user (or thief) can attempt to enter the vehicle 105.

While the present invention has been described with regard to a key fob 110 and LF signals, the method could equally apply to a RF system where a mobile phone (or other RF device) with a motion sensor is used in place of a key fob 110. In this case, the first signal may be transmitted from the authentication device or the vehicle. The second and third signals should be transmitted from the vehicle during PEPS triggering events.

The claims defining the invention are as follows:

1. A method of detecting if a relay is present in a PEPS system for a vehicle, the method comprising:
   (a) determining via a periodically transmitted LF or RF challenge signal whether movement of an authentication device was detected within a predefined time period after the authentication device enters at least one of a PEPS entry operational region or sub-region, the sub-region being a smaller LF operating region within the PEPS entry operational region, wherein at least the PEPS entry operational region is defined by: LF or RF or magnetic fields emitted from antennas associated with the vehicle, and RSSI signal levels measured from the antennas associated with the vehicle; and
   (b) determining via a periodically transmitted LF or RF challenge signal if the authentication device was stationary in at least one of the PEPS entry operational region or sub-region for a predetermined time period during a PEPS entry triggering event.

2. A method of detecting if a relay is present in a PEPS system for a vehicle, the method comprising:
   (a) determining via a periodically transmitted LF or RF challenge signal if an authentication device was within at least one of a PEPS entry operational region or sub-region, the sub-region being a smaller LF operating region within the PEPS entry operational region, and stationary for a predetermined time period during a PEPS entry triggering event; and
   (b) upon a PEPS start sensor on the vehicle being triggered, performing the following:
      i. determining via a periodically transmitted LF or RF challenge signal whether movement of the authentication device was detected within the PEPS entry operational region before the PEPS start sensor on the vehicle was triggered; and
      ii. determining via a periodically transmitted LF or RF challenge signal whether the authentication device was detected within the sub-region as stationary for a predefined time period during the PEPS start triggering event.

3. A method of detecting if a relay is present in a PEPS system for a vehicle, the method comprising:
   (a) determining via a periodically transmitted LF or RF challenge signal whether movement of an authentication device was detected within a predefined time period after the authentication device entered at least one of aPEPS entry operational region or sub-region, the sub-region being a smaller LF operating region within the PEPS entry operational region, wherein the PEPS entry operational region is defined by: LF or RF magnetic fields emitted from antennas associated with the vehicle, and RSSI signal levels measured from the antennas associated with the vehicle; and
   (b) determining via a periodically transmitted LF or RF challenge signal if the authentication device was within at least one of a PEPS entry operational region or sub-region, the sub-region being a smaller LF operating region within the PEPS entry operational region, and stationary for a predetermined time period during a PEPS entry triggering event; and
   (c) upon a PEPS start sensor on the vehicle being triggered, performing the following:
      i. determining via a periodically transmitted LF or RF challenge signal whether movement of an authentication device was detected within the PEPS entry operational region before the PEPS start sensor on the vehicle was triggered; and
      ii. determining via a periodically transmitted LF or RF challenge signal whether the authentication device was detected within the sub-region as stationary for a predefined time period during the PEPS start triggering event.

4. The method of claim 2, wherein the predetermined time period is defined based on system requirements.

5. A system for detecting if a relay is present in a PEPS system for a vehicle, comprising:
   one or more antennas associated with the vehicle for transmitting signals from the one or more antennas to an authentication device, wherein the authentication device includes a motion sensor; and
   one or more controllers, each of which is configured to perform the following:
      (a) determining via a periodically transmitted LF or RF challenge signal whether movement of an authentication device was detected within a predefined time period after the authentication device enters at least one of a PEPS entry operational region or sub-region, the sub-region being a smaller LF operating region within the PEPS entry operational region, wherein the PEPS entry operational region is defined by: LF or RF or magnetic fields emitted from antennas associated with the vehicle, and RSSI signal levels measured from the antennas associated with the vehicle; and (b) determining via a periodically transmitted LF or RF challenge signal if the authentication device was stationary in at least one of the PEPS entry operational region or sub-region for a predetermined time period during a PEPS entry triggering event.

6. A system for detecting if a relay is present in a PEPS system for a vehicle, comprising:

one or more antennas associated with the vehicle for transmitting signals from the one or more antennas to an authentication device, wherein the authentication device includes a motion sensor; and one or more controllers, each of which is configured to perform the following:

(a) determine via a periodically transmitted LF or RF challenge signal if the authentication device was within at least one of a PEPS entry operational region or sub-region, the sub-region being a smaller LF operating region within the PEPS entry operational region, and stationary for a predetermined time period during a PEPS entry triggering event; and (b) upon a PEPS start sensor on the vehicle being triggered, performing the following:

i. determining via a periodically transmitted LF or RF challenge signal whether movement of an authentication device was detected within the PEPS entry operational region before the PEPS start sensor on the vehicle was triggered; and ii. determining via a periodically transmitted LF or RF challenge signal whether the authentication device was detected within the sub-region as stationary for a predefined time period during the PEPS start triggering event.

7. A system for detecting if a relay is present in a PEPS system for a vehicle, comprising:

one or more antennas associated with the vehicle for transmitting signals from the one or more antennas to an authentication device, wherein the authentication device includes a motion sensor; and one or more controllers, each of which is configured to perform the following:

(a) determining via a periodically transmitted LF or RF challenge signal whether movement of an authentication device was detected within a predefined time period after the authentication device enters at least one of a PEPS entry operational region or sub-region, the sub region being a smaller LF operating region within the PEPS entry operational region, wherein the PEPS entry operational region is defined by: LF or RF magnetic fields emitted from antennas associated with the vehicle, and RSSI signal levels measured from the antennas associated with the vehicle;

(b) determining via a periodically transmitted LF or RF challenge signal if the authentication device was within at least one of a PEPS entry operational region or sub-region, the sub-region being a smaller LF operating region within the PEPS entry operational region, and stationary for a predetermined time period during a PEPS entry triggering event; and (c) upon a PEPS start sensor on the vehicle being triggered, performing the following:

i. determining via a periodically transmitted LF or RF challenge signal whether movement of the authentication device was detected within the PEPS entry operational region before the PEPS start sensor on the vehicle was triggered; and ii. determining via a periodically transmitted LF or RF challenge signal whether the authentication device was detected within the sub-region as stationary for a predefined time period during a PEPS start triggering event.

8. The system of claim 5, wherein the controller is only located in the vehicle or the authentication device.

9. The system of claim 5, wherein a controller is located in both the vehicle and the authentication device.

* * * * *